US012719938B2

(12) United States Patent
Yang et al.

(10) Patent No.: US 12,719,938 B2
(45) Date of Patent: Aug. 25, 2026

(54) METHOD AND SYSTEM TO IMPROVE IMS REGISTRATION FAILURE DUE TO P-CSCF SERVER CONNECTION FAILURE

(71) Applicant: INNOPEAK TECHNOLOGY, INC., Palo Alto, CA (US)

(72) Inventors: Jaehyeuk Yang, San Diego, CA (US); Xin Xu, San Diego, CA (US); Yongsheng Shi, San Diego, CA (US)

(73) Assignee: INNOPEAK TECHNOLOGY, INC., Palo Alto, CA (US)

( * ) Notice: Subject to any disclaimer, the term of this patent is extended or adjusted under 35 U.S.C. 154(b) by 375 days.

(21) Appl. No.: 18/364,097

(22) Filed: Aug. 2, 2023

(65) Prior Publication Data

US 2023/0379368 A1 Nov. 23, 2023

Related U.S. Application Data

(63) Continuation of application No. PCT/US2022/014855, filed on Feb. 2, 2022.

(Continued)

(51) Int. Cl.

*H04L 65/1016* (2022.01)
*H04L 65/1045* (2022.01)

(Continued)

(52) U.S. Cl.

CPC ...... *H04L 65/1016* (2013.01); *H04L 65/1045* (2022.05); *H04L 65/1073* (2013.01); *H04L 65/1104* (2022.05); *H04W 36/00226* (2023.05)

(58) Field of Classification Search

CPC ............. H04L 65/1016; H04L 65/1045; H04L 65/1073; H04L 65/1104; H04W 36/00226; H04W 76/16; H04W 76/18

See application file for complete search history.

(56) References Cited

U.S. PATENT DOCUMENTS 10,064,112 B2 * 8/2018 Deivasigamani ............................ H04M 15/8061
2008/0254795 A1 * 10/2008 Ratcliffe ............. H04L 65/1045 455/435.1

(Continued)

FOREIGN PATENT DOCUMENTS

| | | |
|---|---|---|
| CN | 101816161 A | 8/2010 |
| CN | 112272936 A | 1/2021 |
| WO | 2013156061 A1 | 10/2013 |

OTHER PUBLICATIONS

First office action of Chinese application No. 202280009457.1 issued on Jul. 23, 2025.

(Continued)

*Primary Examiner* — Noel R Beharry
(74) *Attorney, Agent, or Firm* — Sheppard, Mullin, Richter & Hampton LLP

(57) ABSTRACT

Systems and methods are provided for improving the overall experience for users conducting voice calls over 5G. For example, failing to establish a Transport Control Protocol (TCP) connection to a Proxy-Call Session Control Function (P-CSCF) server leads to user equipment (UE) not registering to an Internet Protocol Multimedia Subsystem (IMS), and impacts the 5G voice call. A voice call flow handling function on the UE performs several handling procedures to dynamically adjust the flow to address failed connections to the P-CSCF server. After initiating a 5G voice call, the UE can detect a failed connection to the P-CSCF server. In response, a secondary P-CSCF server from a plurality of available P-CSCF servers is selected. A connection to the selected secondary P-CSCF server is attempted. A successful connection to the selected secondary P-CSCF server supports the UE registering to the IMS to conduct the voice call over 5G New Radio (NR).

18 Claims, 6 Drawing Sheets

Related U.S. Application Data

(60) Provisional application No. 63/145,706, filed on Feb. 4, 2021.

(51) Int. Cl.

| | |
|---|---|
| ***H04L 65/1073*** | (2022.01) |
| ***H04L 65/1104*** | (2022.01) |
| ***H04W 36/00*** | (2009.01) |

(56) References Cited

U.S. PATENT DOCUMENTS

| | | | | |
|---|---|---|---|---|
| 2013/0051333 | A1 | 2/2013 | Purohit et al. | |
| 2015/0124588 | A1 | 5/2015 | Hallenstal et al. | |
| 2016/0353344 | A1* | 12/2016 | Deivasigamani | H04W 4/24 |
| 2018/0132291 | A1 | 5/2018 | Kalepu et al. | |
| 2020/0008069 | A1 | 1/2020 | Zhu et al. | |
| 2020/0153874 | A1* | 5/2020 | Christopher | H04L 65/1069 |
| 2021/0266349 | A1* | 8/2021 | Foti | H04L 65/1104 |
| 2022/0053031 | A1* | 2/2022 | Huang | H04L 65/1016 |

OTHER PUBLICATIONS

International Search Report and Written Opinion dated Apr. 19, 2022 in International Application No. PCT/US2022/014855.

Cisco "MME Administration Guide. StarOS Release 21.6" Jan. 25, 2018 Jan. 25, 2018) Retrieved on Mar. 27, 2022 (Mar. 27, 2022)from<https://www.ciscocom/c/en/us/td/docs/wireless/asr_5000/21-6_N6-0/MME-Admin/21-6-MME-Admin/21-6-MME-Admin_chapter_011011.html> entire document.

* cited by examiner

METHOD AND SYSTEM TO IMPROVE IMS REGISTRATION FAILURE DUE TO P-CSCF SERVER CONNECTION FAILURE

CROSS-REFERENCE TO RELATED APPLICATION

The present application is a continuation of International Application No. PCT/US2022/014855 titled "METHOD AND SYSTEM TO IMPROVE IMS REGISTRATION FAILURE DUE TO P-CSCF SERVER CONNECTION FAILURE" and filed on Feb. 2, 2022, which claims priority to U.S. Patent Application No. 63/145,706, filed Feb. 4, 2021 and titled "METHOD AND APPARATUS TO IMPROVE IMS REGISTRATION FAILURES DUE TO P-CSCF SERVER CONNECTION FAILURE", both of which are incorporated herein by reference in its entirety.

FIELD

The present application generally relates to telecommunications and broadband cellular networks, particularly to methods and a system for improving user experience relating to supporting voice services over 5G networks.

BACKGROUND

In many cases, 5G NR and VoNR must utilize an IMS network to handle the voice services, even across the many deployments that are possible for voice over 5G networks. Thus, in order to conduct a voice, call entirely over 5G, the user equipment (UE) must successfully register with the IMS. As a result, when a user initiates a voice call over 5G, but the IMS registration has failed or the IMS registration is still in progress (e.g., IMS registration status is not registered), the voice call may be immediately rejected because the UE has not registered with the IMS prior to the call. Also, in a scenario where there is a permanent IMS registration failure on 5G NR, it is possible for the 5G NR to be disabled on the UE in order to use a legacy network, such as 4G LTE or CS radio access technology (RAT) (e.g., 2G GSM and/or 3G WCDMA). In addition, in some scenarios, where there are significant delays in SIP messages and/or loss of SIP signaling, then the UE's registration with the IMS can fail. In other words, if there is a point-of-failure that is particularly experienced in the SIP session with the IMS (e.g., SIP/TCP connection fails between the UE and one of the servers of the IMS) there can be an overall failure to conduct a voice call entirely over 5G, as the UE cannot successfully complete its registration with the IMS.

SUMMARY

To solve the above technical problem or at least partially solve the above technical problem, the present disclosure provides a method and system to improve IMS registration failure due to P-CSCF server connection failure.

In a first aspect, an embodiment of the present disclosure provides a computer-implemented method, including: initiating a voice call, wherein the voice call includes a voice session over 5G new radio (NR) initiated via a user equipment (UE); in response to a failure of a first connection to an initial Proxy-Call Session Control Function (P-CSCF) server, selecting a secondary P-CSCF server from a plurality of P-CSCF servers, wherein each of the plurality of P-CSCF servers are available to connect to the UE; and attempting to establish a second connection to the selected secondary P-CSCF server, wherein the secondary connection supports a registration to an IP Multimedia Subsystem (IMS) for the UE to conduct the voice call as the voice session over 5G NR.

In some possible implementations, the computer-implemented method further includes: in response to a failure of the second connection to the selected secondary P-CSCF server, performing actions to conduct the voice call as the voice session over 5G NR.

In some possible implementations, the second connection to the selected secondary P-CSCF server is a Transmission Control Protocol (TCP) connection.

In some possible implementations, performing actions to conduct the voice call as the voice session over 5G NR includes: establishing a Session Initiation Protocol (SIP) session over the TCP connection, wherein the SIP session supports the registration to the IMS for the UE.

In some possible implementations, the failure of the first connection to the initial P-CSCF server includes identifying a TCP timeout.

In some possible implementations, the computer-implemented method further includes: maintaining a count of the number of failed connections with the initial P-CSCF server; and in response to the count having reached the defined threshold, placing the initial P-CSCF server on a blacklist associated with the registration to the IMS for the UE.

In some possible implementations, the initial P-CSCF server and the plurality of P-CSCF servers are deployed on the IMS infrastructure.

In some possible implementations, selecting a secondary P-CSCF server from a plurality of P-CSCF servers is based on a round-robin scheme.

In some possible implementations, the computer-implemented method further includes: in response to a failure of the UE to connect to each of the plurality of P-CSCF servers, disconnecting a Protocol Data Unit (PDU) session associated with the registration to the IMS for the UE; and performing a subsequent PDU session establish procedure for reconnecting the PDU session to restore P-CSCF addresses corresponding to the initial P-CSCF server and the plurality of P-CSCF servers.

In some possible implementations, the computer-implemented method further includes: in response to a failure of the registration to the IMS for the UE, temporarily disabling 5G NR on the UE; completing a radio access technology (RAT) selection of 2G or 3G for the UE; bringing up circuit switched fallback (CSFB); and conducting the voice call using circuit switch voice services.

In some possible implementations, the failure of the registration to the IMS for the UE is based on the UE failing to connect to each of the plurality of P-CSCF servers.

In some possible implementations, the computer-implemented method further includes re-enabling the 5G NR.

In a second aspect, an embodiment of the present disclosure provides a computer-implemented method, including: initiating a voice call, wherein the voice call includes a voice session over 5G new radio (NR) initiated via a user equipment (UE); and prior to establishing a connection with a Proxy-Call Session Control Function (P-CSCF) server for the UE, sending an Internet Control Message Protocol (ICMP) message to the P-CSCF.

In some possible implementations, the computer-implemented method further includes: determining if an ICMP response message is received from the P-CSCF server in response to the ICMP message, wherein receiving the ICMP response message confirms an availability of the P-CSCF server; and in response to determining that the ICMP response message is successfully received to confirm the availability of the P-CSCF server, establishing a connection with the P-CSCF server.

In some possible implementations, the ICMP message is a ping packet and the ICMP response is a ping packet response.

In some possible implementations, the computer-implemented method further includes: in response to determining that the ICMP response message is not received, continuing to send ping packets to the P-CSCF until a ping packet response is successfully received or until a defined time period expires.

In some possible implementations, the connection to the P-CSCF server is a Transmission Control Protocol (TCP) connection.

In some possible implementations, the computer-implemented method further includes: establishing a Session Initiation Protocol (SIP) session over the TCP connection, wherein the SIP session supports a registration to an IP Multimedia Subsystem (IMS) for the UE to conduct the voice call as the voice session over 5G NR; and performing actions to conduct the voice call as the voice session over 5G NR.

In a third aspect, an embodiment of the present disclosure provides a computer system, including: one or more processors; and a memory having instructions stored thereon, which when executed by the one or more processors cause the processors to perform: initiating a voice call, wherein the voice call includes a voice session over 5G new radio (NR) initiated via a user equipment (UE); in response to a failure of a first connection to an initial Proxy-Call Session Control Function (P-CSCF) server, selecting a secondary P-CSCF server from a plurality of P-CSCF servers, wherein each of the plurality of P-CSCF servers are available to connect to the UE; and attempting to establish a second connection to the selected secondary P-CSCF server, wherein the secondary connection supports a registration to an IP Multimedia Subsystem (IMS) for the UE to conduct the voice call as the voice session over 5G NR.

In some possible implementations, the computing system is a 5G-enabled mobile computing device.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
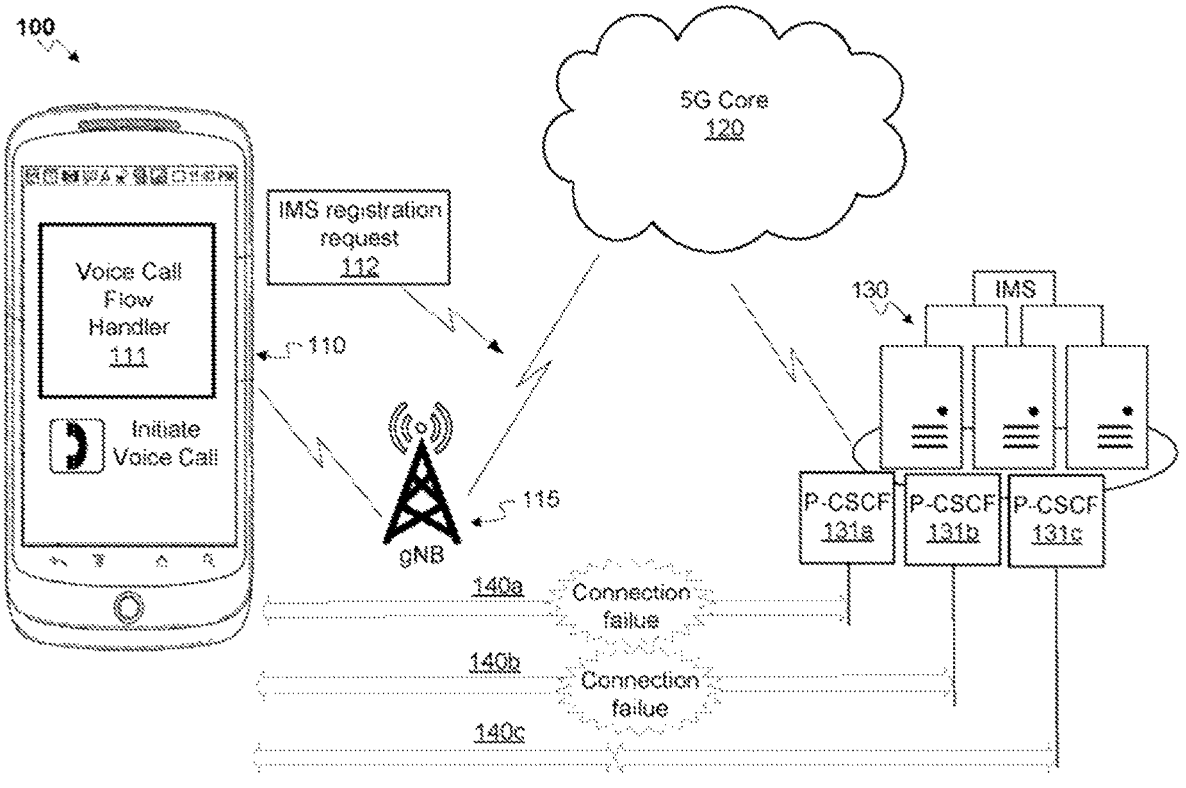
FIG. 1 depicts an example computing system, such as a mobile computing device, implementing the voice call over 5G flow handling procedures for addressing connection failures to Proxy-Call Session Control Function (P-CSCF) servers, in accordance with embodiments of the application.

These illustrative embodiments are mentioned not to limit or define the disclosure, but to provide examples to aid understanding thereof. Additional embodiments are discussed in the Detailed Description, and further description is provided there.

DETAILED DESCRIPTION

Fifth-generation wireless (5G) is an iteration of a cellular technology standard for broadband cellular networks, required by International Mobile Telecommunications as the standard to support an all Internet Protocol (IP) network. 5G technology supports faster data rates, higher connection density, and much lower latency. 5G was deployed as the planned successor to the 4G networks which provide connectivity to most current cellphones. 5G technology has been engineered to greatly increase the speed and responsiveness of wireless networks. With 5G, data transmitted over wireless broadband connections can travel at multigigabit speeds, with potential peak speeds as high as 20 gigabits per second (Gbps) by some estimates. These speeds greatly exceed wireline network speeds and offer latency of 1 millisecond (ms) or lower, which is useful for applications that require real-time feedback. Thus, 5G technology can enable a sharp increase in the amount of data transmitted over wireless systems due to more available bandwidth and advanced antenna technology.

Although 5G is considered a main driver for enhanced data services, voice and video remain key elements to subscribers. As the number of worldwide voice subscriptions and the demands from subscribers continues to grow, cellular providers must offer an increasing amount of voice services. Telecommunication networks have evolved from circuit-switched (CS) 2G networks, with an initial focus on telephony, to fully packet-switched (PS) 4G networks focused on Internet data communications. Additionally, the increase of device penetration is forcing network traffic to move from the circuit-switched domain (3G/2G) to the packet-switched domain. This allows operators to re-use the 3G/2G spectrum for new technologies and reduce the operational cost of legacy technologies while improving the network capacity and performance. Moreover, there are other benefits of leveraging all packet-based voice services, such as VoLTE. For example, packet-based voice services bring a richer customer experience by introducing new features such as HD voice, video calling, and Rich Communication Services (RCS). Packet-based voice services can also enable faster network technology migration by simplifying the network architecture and retiring the older technology layers. With the deployment of 5G, and with limited spectrum supporting all technologies, it is even more critical for cellular providers to include Voice over New Radio (VoNR) services (which supports 5G-based voice services) and migrate customers to 5G.

In some deployments, the 5G network is implemented as a stand-alone network. For example, in 5G NR, a voice call is supported entirely over the packet switching (PS) domain with IP Multimedia Subsystem (IMS) signaling and media. Similar to 4G Long Term Evolution (LTE) networks, 5G voice calls are implemented as end-to-end voice over IP (VoIP) connections managed by the IMS core. In other words, the IMS core provides voice as a 5G application service. Voice and video communications services in 5G networks can be implemented on top of the IP data connection. Therefore, the IMS architecture plays an increasingly important role in 5G VoNR. Unlike voice services provided by external applications (i.e., so-called OTT speech services), voice over IMS supports quality of service (QoS) management across the entire 5G system (5GS). While IMS can provide voice services for various types of access (e.g., fixed, cable and 2G/3G) as well as for 5G deployments, 5G is not as flexible. In many cases, 5G NR and VoNR must utilize an IMS network to handle the voice services, even across the many deployments that are possible for voice over 5G networks. Thus, in order to conduct a voice, call entirely over 5G, the user equipment (UE) must successfully register with the IMS.

As a result, when a user initiates a voice call over 5G, but the IMS registration has failed or the IMS registration is still in progress (e.g., IMS registration status is not registered), the voice call may be immediately rejected because the UE has not registered with the IMS prior to the call. Also, in a scenario where there is a permanent IMS registration failure on 5G NR, it is possible for the 5G NR to be disabled on the UE in order to use a legacy network, such as 4G LTE or CS radio access technology (RAT) (e.g., 2G GSM and/or 3G WCDMA).

Furthermore, in operation, the user can connect to the IMS in various ways, most of which use the standard IP. For instance, in many deployments, the IMS can utilize IP-based Session Initiation Protocol (SIP), which enables the system to be leveraged to support voice services over an IP packet-switched network. By utilizing SIP, a UE can register directly on IMS over IP, even when they are roaming in another network or country (the visited network). For example, a UE can register to the IMS over the 5G network via SIP. Therefore, the performance of SIP during this process can also be a contributing factor to the success of IMS registration. For example, in some scenarios, where there are significant delays in SIP messages and/or loss of SIP signaling, then the UE's registration with the IMS can fail. In other words, if there is a point-of-failure that is particularly experienced in the SIP session with the IMS (e.g., SIP/TCP connection fails between the UE and one of the servers of the IMS) there can be an overall failure to conduct a voice call entirely over 5G, as the UE cannot successfully complete its registration with the IMS.

In particular, an example of a point-of-failure in a SIP session with the IMS that may impact a 5G voice call, is the UE failing to connect with a Proxy-Call Session Control Function (P-CSCF). As will be described in detailed below, the IMS defines an architecture of logical elements using SIP for call signaling between network elements and provides a layered approach with defined service, control, and transport planes. Several roles of SIP servers (or proxies) of the IMS, collectively called Call Session Control Function (CSCF), are used to process SIP signaling packets within the IMS. One of these SIP servers of the IMS is the P-CSCF. The P-CSCF acts as the ingress and egress point to and from a service provider's IMS domain with respect to the IMS client. The P-CSCF has a large number of responsibilities, including: onward routing of registration and session requests to the correct nodes in the network; ensuring the S-CSCF (Serving CSCF) is kept updated on the access network the subscriber is using; providing session information to the PCRF (Policy and Charging Rules Function); and maintaining a secure connection with the client device. Thus, as the P-CSCF serves an important role with respect to the IMS, the UE failing to properly connect and/or communicate with the P-CSCF can cause issues with the IMS registration. For example, in scenarios when the UE makes a TCP connection in attempts to establish an SIP session with the P-CSCF (e.g., deliver a SIP Register packet), but the P-CSCF server is not responding, the UE may fail to register with the IMS (or lose IMS service for a prolonged period of time) which ultimately affects the user's voice services over 5G.

While disabling 5G does avoid the UE being stuck in 5G (while the IMS is not registered), it also causes the UE to not have voice service enabled until it is registered over another network, like 4 G LTE or CS RAT. If occurrences of rejected voice calls and/or loss of voice services becomes widespread due to these types of circumstances, it may negatively impact the overall user experience for 5G networks. Thus, in order to improve the user's experience when conducting voice calls in a 5G NR deployment, the disclosed methods allow the flow for handling voice call establishment to be dynamically adjusted in a manner that considers the IMS, and specifically connecting with P-CSCF servers (as a point-of-failure in SIP communication with the IMS).

Embodiments of the application provide distinct methods and system for improving the overall experience for users conducting voice calls over 5G, despite disrupted and/or failed connections with the P-CSCF (which further cause adverse status or failure of IMS registration). Particularly, after a voice call is initiated via a UE device over 5G, the disclosed techniques can detect a failure with the P-CSCF (e.g., no response from the P-CSCF, failure to connect to the P-CSCF) that is associated with establishing the IMS registration for the voice call. Thereafter, the voice call handling functions may be adjusted in a manner that is deemed most efficient and reliable to successfully connect to one or more available P-CSCFs based on the type of failure that is detected and completing the voice call. The disclosed embodiments may avert unnecessary delays, prevent failures, and improve reliability associated with conducting voice calls in 5G networks, thereby increasing the call success rate of the UE and enhancing the user's experience in 5G networks.

Referring now to FIG. 1, an example of a communications network environment 100 for a broadband cellular network in which the mobile computing device 110 employing the disclosed techniques for improving voice calls over 5G may be employed. The mobile computing device 110 can be a UE that has 5G capabilities. In the example of FIG. 1, the mobile computing device 110 is shown as a handheld user device, and more specifically a smartphone. However, the mobile computing device 110 may be implemented as various other wireless devices that are used directly by an end-user to communicate and equipped with telecommunication functions, such as voice, video, and text. For example, the mobile computing device 110 may also be implemented as a cellular telephone, a laptop computer equipped with a mobile broadband adapter, or other computing device. Accordingly, as a 5G-enabled smartphone, the mobile computing device 110 is capable of supporting enhanced data services, voice (e.g., voice calls over 5G NP, VoNP, etc.), video, and other telecommunication functions that are commonly employed by subscribers to broadband cellular networks. Furthermore, the mobile computing device 110 is depicted to include a voice call flow handler 111 that implements the disclosed techniques for improving the experience for users conducting voice calls over 5G, as described in greater detail herein.

As previously alluded to, there are various deployments that can be used to implement a 5G network. For example, in a non-stand-alone (NSA) deployment mode, LTE plus NR with an evolved packet core (EPC) may be employed. In contrast, there is a stand-alone (SA) deployment mode that involves NR with the 5G core (5GC). In addition, there are 5G deployments where cellular network providers can have an existing 4G LTE network, and a 5G network is deployed alongside of the legacy network. In this way, 5G NR serves as a secondary cell and the core technology remains the EPC. The disclosed techniques, for example the voice call flow handler 111 on the mobile computing device 110, can be employed for voice calls over a 5G network that has been set-up using any of the aforementioned deployment modes. FIG. 1 shows a communications network environment 100 for a 5G network having an example deployment that includes: the mobile computing device 110 (or UE); a gNodeB (gNB) 115; a 5GC 120; an IMS 130; and multiple P-CSCF servers 131_a_-131_c_ that are deployed on the IMS 130.

In the example of FIG. 1, the mobile computing device 110 may be employed by a user that is subscribed to a cellular provide that supports 5G. Thus, the mobile computing device 110 may include hardware, software applications, and the like, which allows the mobile computing device 110 to be configured for 5G capability. Accordingly, a user can employ their mobile computing device 110 for multimedia telephone services including audio, video, and text, and particularly to conduct voice calls over the 5G network in environment 100. The mobile device 110 can include an operating system that provides an interface between the mobile computing device's 110 hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS—a variety of UNIX operating systems, or a proprietary operating system for computerized devices. The operating system may provide a platform for the execution of application programs that facilitate interaction between the computing device and a user.

The mobile computing device 110 may include other applications, computing sub-systems, and hardware. The voice call flow handler 111 can be implemented on the mobile computing device 110 as hardware, a stand-alone processor, firmware, a software application, or any combination thereof. According to the disclosed embodiments, the voice call flow handler 111 may receive an indication of a user initiating an outgoing voice call and/or receiving an incoming voice call, where their voice calls are intended to be supported over 5G. The voice call flow handler 111 is configured to dynamically adjust a flow for detecting a failure related to connecting to a P-CSCF (e.g., no response from the P-CSCF, failure to connect to the P-CSCF), and handling voice calls over 5G in a manner that is deemed most efficient and reliable for successfully connecting to one of the available P-CSCFs, shown as P-CSCFs 131_a_-131_c_, based on the type of failure that is detected. An example function of the voice call flow handler 111 to enhance the user's experience regarding voice services in 5G network is described below in detail.

Also, FIG. 1 shows that the communications network environment 100 includes a gNG 115. The gNB 115 is a 5G Base Station that uses New Radio (NR) technology. The NR access technology for 5G can be generally described as a replacement for LTE, and thus the new base station for NR is the gNB 115. The gNB 115, acting as a 5G wireless base station, is illustrated in FIG. 1 as transmitting and/or receiving communications between the mobile computing device 110 (or UE) and the mobile network. FIG. 1 illustrates the gNB providing a cell within the 5G network coverage which can be used for transmission of voice, data, and other types of content via the 5GC 120.

The 5GC 120 can be described as the part of the 5G network deployment that provides 5G services to mobile subscribers, such as the user of mobile computing device 110, through the radio access network (RAN), for instance the 5G NR RAN. The 5GC 120 can also serve as a gateway to other networks, such as the public switched telephone network, public cloud, and the IMS 130. In the example, the 5GC 120 connects to IMS 130 supporting voice services. The IMS 130 is a standardized architectural framework for delivering IP multimedia services. Furthermore, the IMS 130 provides connection management for voice services in 5G, like in legacy LTE networks. IMS 130 utilizes IP-based SIP, which enables the system to be leveraged to support voice services over an IP packet-switched network.

In some 5G deployments, the NR does not support voice services. Thus FIG. 1 illustrates an example where the 5GC 120 offers a connection to IMS 130 to support voice over 5G. In order for the mobile computing device 110 to conduct a voice call over 5G, it may be a requirement for the device 110 to first register with IMS 130 that is supporting voice services prior to connecting the voice call. From a high-level perspective, voice services that run over the 5G, such as VoNR, are voice over IP using the IMS 130 infrastructure. This requirement to register to IMS 130 can cause a number of issues in supporting voice over 5G that may degrade the user's experience, as previously described, including increasing the risk of a large number of call drops.

As alluded to above, the IMS 130 infrastructure includes logical elements using SIP for call signaling between network elements and provides a layered approach with defined service, control, and transport planes. There are several roles of SIP servers (or proxies) that include the IMS 130, which is collectively referred to herein as CSCF. CSCF servers, such as Interrogating-CSCF (I-CSCF) (not shown), Serving-CSCF (S-CSCF) (not shown), and P-CSCF 131_a_-131_c_ provide various functions and roles that are necessary for supporting IMS service, and generally are used to process SIP signaling packets with the IMS 130. FIG. 1 particularly shows the P-CSCF servers 131_a_-131_c_ that are included in the architecture IMS 130. As a referred to herein, P-CSCFs 131_a_-131_c_ act as the ingress and egress points to and from the IMS 130 domain with respect to the IMS client, namely the mobile computing device 110. The P-CSCF has many responsibilities, including onward routing of registration and session requests to the correct nodes in the network and the IMS 130, and maintaining a secure connection with the clients of the IMS 130, such as mobile computing device 110. Thus, in the event where the mobile computing device 110 cannot connect to one of the P-CSCFs 131_a_-131_c_, it may lead to problems with the device 110 properly registering to the IMS 130.

However, as illustrated in FIG. 1, deployments can include a plurality of P-CSCF servers that are available to support a client device's connection to an IMS. There may be multiple P-CSCF servers that are distributed across different network regions, administrative domains, and service provider networks. Consequently, for example, as the mobile computing device 110 is used in different geographical areas, the different P-CSCFs can become available to connect the mobile computing device 110 to IMS services.

For example, the mobile computing device 110 may be in a location that is inside of the service area of their home service provider's network, where P-CSCFs of that service provider are available and can connect to the mobile computing device 110 to for IMS service. However, if the mobile computing device 110 is being used outside of their home service provider's network, although connections to the previous P-CSCFs may fail, a visited service provider's network can have P-CSCFs that the mobile computing device 110 may be able to connect to establish IMS services.

As another example, as shown in FIG. 1, an IMS 130 can include multiple P-CSCF servers that are deployed locally in its architecture, in order to implement various efficiencies (e.g., load balancing, redundancy, location-specific support). Consequently, in the event that any one of the P-CSCF servers 131*a*-131*c* fails, there is another P-CSCF server on the IMS 130 that is still available to the support the mobile computing device 110. According to the embodiments, the voice call flow handler 111 is particularly implemented to leverage the availability of multiple P-CSCFs, as described in the aforementioned scenarios, that can potentially support a connection with the mobile computing device 110 to successfully provide IMS services. That is, the voice call flow handler 111 can detect if there is a failure related to connecting to a P-CSCF, such failed and/or non-responsive P-CSCF server, or a failed connection to the P-CSCF. As a result, the voice call flow handler 111 can execute one of several defined procedures that can address the detected failure, and dynamically adjusts the flow to establish a connection to another P-CSCF or that may be available to the mobile computing device 110 in a manner that is deemed optimal or efficient based on the type of failure. Thus, the voice call flow handler 111 can mitigate points-of-failures in a SIP session associated with registering to the IMS 130 that may impact the 5G voice call, particularly the mobile computing device 110 failing to connect to a P-CSCF. In turn, by improving IMS registration failures that are due to P-CSCF server connection failures, the voice call flow handler 111 achieves improvements in the user's experience using voice over 5G, such as reducing delays and rejected calls. FIG. 1 illustrates an example of one such procedure that is implemented by the voice call flow handler 111, according to the disclosed techniques.

In operation, a user can initiate a voice call using their 5G-enabled mobile computing device 110. For example, the user can press a displayed icon from the mobile computing device's 110 user interface to start a voice call, which initiates a call flow for establishing a UE originated voice session over 5G NR. Prior to connecting the call, the mobile computing device 110 must begin a procedure to register with the IMS 130. The registration procedure involves the UE, shown as mobile computing device 100, and the network exchanging the parameters and capabilities of both entities. The registration procedure can start with the UE, namely mobile computing device 110, establishing an IMS data network name (DNN) packet data unit (PDU) session in 5GC 120 which allows the UE to register in IMS 130 as a prerequisite for voice session setup. As depicted in FIG. 1, the mobile computing device 110 can transmit a registration request message 112. In a registration request message 112, a UE can indicate its usage setting to the network. The usage setting can be data centric or voice centric. As the mobile computing device 110 has initiated a voice call, the UE usage setting in the registration request message 112 will indicate voice centric mode. Also, the registration request 112 can indicate the mobile computing device's 110 IMS-related parameters. Common IMS parameters the UE may support are, for example, the indication of voice over E-UTRA support, voice over secondary cell group (SCG) bearer support and an indication of voice fallback into EPS. The 5GC 120 receives the registration request 112 and will provide a proper response depending on the network capabilities or offerings. Not all steps that are involved in the procedure for the mobile computing device's 110 registration in IMS is described for brevity. Generally, the objective is to register the UE primarily in the 5G network, even if voice services are not supported (and a handover to LTE would be required). Nonetheless, there may be circumstances, such as the mobile computing device 110 currently being in an area that has poor 5G coverage, that may stall the exchange of communication between the entities in the registration procedure.

A successful procedure for PDU session establishment setup would be followed by a flow to establish IMS registration. As previously described, the UE can begin the registration process with the IMS 130 using SIP messaging over the IMS DDN PDU. SIP, as referred to herein, is a signaling protocol used for initiating, maintaining, and terminating real-time sessions that include voice, video and messaging applications Furthermore, SIP is designed to be independent of the underlying transport layer protocol and can be used with the User Datagram Protocol (UDP), the Transmission Control Protocol (TCP), and the Stream Control Transmission Protocol (SCTP). In some 5G deployments, after the PDU session is successfully established, the subsequent flow for IMS registration can involve setting up a TCP connection between the UE and a P-CSCF at the ingress point of the IMS. By having this TCP connection established, SIP can be utilized over the TCP in order to support the messaging needed to conduct IMS registration. In the example of FIG. 1, the mobile computing device 110 (or UE) initially attempts to establish a first TCP connection 140 with one of the P-CSCF servers 131*a*-131*c*. For example, the IMS 130 infrastructure can have a default P-CSCF server defined, where the default P-CSCF server is initially selected by the IMS 130 to set-up any TCP connections with the mobile computing device 110 in order to use SIP for the IMS registration flow. In the illustrated example, the mobile computing device 110 is shown as initially attempting to bring up the first TCP connection 140*a* with the P-CSCF server 131*a*, which may be defined as the default (or initial) P-CSCF server for the IMS 130. If this first TCP connection 140*a* was successfully established, then a SIP session could begin to allow the mobile computing device 110 to register to IMS 130. However, FIG. 1 illustrates that there is a failure that is experienced in establishing this first TCP connection 140*a* with P-CSCF 131*a*, and in turn, the SIP session cannot be properly set-up with the IMS 130, which could potentially lead to a complete failure in the IMS registration and catastrophic interruption and/or failure of 5G voice call. There can be several factors that may cause a TCP connection to a P-CSCF server, which is otherwise operational, to fail. For example, a TCP connection may fail if there are configuration issues related to TCP (e.g., an invalid IP address, an invalid host name), routing problems, network connectivity issues, and the like.

The voice call flow handler 111 is configured to detect that a failure has occurred in this first TCP connection 140*a* to the default P-CSCF server 131*a*. In an embodiment, the voice call flow handler 111 can detect that a TCP connection failure has occurred by detecting transmission of a TCP "connection timeout" indication, or other mechanism of the protocol that is indicative of a failure to create a connection to a host. By detecting that the initially attempted TCP connection 140*a* has experienced some type of failure, the voice call flow handler 111 has an awareness that the mobile computing device 110 is not successfully connected to the IMS 130 in a manner that would support the SIP-based IMS registration process. However, the voice call flow handler 111 does not immediately reject the voice call, as the IMS registration is in progress, rather allows for an additional amount of time for the IMS registration procedure to successfully complete (mobile computing device 110 registered to IMS 130), and dynamically adjusts the flow to selectively switch to another one of the available P-CSCF servers 131*b*, 131*c* in the IMS 130 architecture. Therefore, the voice call flow handler 111 allows time to make one or more subsequent attempts to establish a different TCP connection to other available P-CSCF servers prior to the IMS registration completely failing, which would lead to a substantive degradation in the user's experience, such as the voice call over 5G being dropped. For instance, each time a TCP connection failure is detected with a P-CSCF, the voice call flow handler 111 can select a different P-CSCF server from amongst the group of deployed P-CSCF servers 131*a*-131*c* in a round-robin fashion, in order to perform successive attempts to establish a TCP connection for the mobile computing device 110 successfully.

As an example, FIG. 1 illustrates that subsequent to the first TCP connection 140*a* failing, the voice call flow handler 111 can selectively switch to P-CSCF 131*b*, and then attempt to establish a second TCP connection 140*b* between the mobile computing device 110 and P-CSCF 131*b*. However, in the example, there is an issue with connecting with P-CSCF 131*b*, and there is a failure in the second TCP connection 140*b*. In response to detecting yet another TCP connection failure, the voice call flow handler 111 can select P-CSCF server 131*c*, which is a P-CSCF that has yet to be contacted on the IMS 310, and attempts a third TCP connection 140*c*. FIG. 1 illustrates that this third TCP connection 140*c* between the P-CSCF server 131*c* and the mobile computing device 110 is successful, and thus there is a connection to at least one of the available P-CSCFs on the IMS 130 in the underlying transport layer protocol for a SIP session, which allows the device's 110 IMS registration to be conducted. Then, upon successful completion of the IMS registration, the 5G network provides a proper response for the IMS registration request message 112. In an embodiment, the voice call flow handler 111 implements a round-robin scheme with respect to selecting a different P-CSCF server in successive TCP connection attempts. For example, in a round-robin scheme, the voice call flow handler 111 can forward each subsequent TCP connection attempt to a next P-CSCF server in a defined order, in turn, and goes back to the top of the order and repeats again until a successful TCP connection is established, or a defined wait period expires. Although a round-robin scheme is described, the implementation is not intended to be limited, and the voice call flow handler 111 can be configured to implement other selection algorithms that are utilized in computing technology, in order to perform selection amongst available P-CSCF servers for successive TCP connection attempts, as deemed necessary and/or appropriate.

In existing UEs, there would be no corrective response to a TCP connection failure to a P-CSCF, and thus in these failure scenarios, the mobile computing device 110 would not be registered to IMS 130 (and thus not properly set-up for connections to IMS 130 supporting voice services over 5G) and would immediately reject the voice call (e.g., NR does not support voice services over 5G). However, by dynamically adjusting the flow to handle a TCP connection failure to a P-CSCF in the IMS registration process, for example using the aforementioned P-CSCF selection procedure, the voice call flow handler 111 can avoid and/or substantively reduce voice calls being dropped, and thereby enhance voice services over 5G NR for subscribers. Further details regarding the various procedures that can be implemented to control the flow for handling voice calls to enhance voice services in 5G, in accordance with the disclosed embodiments, will now be described in reference to FIG. 2-FIG. 5.

Figure 2:
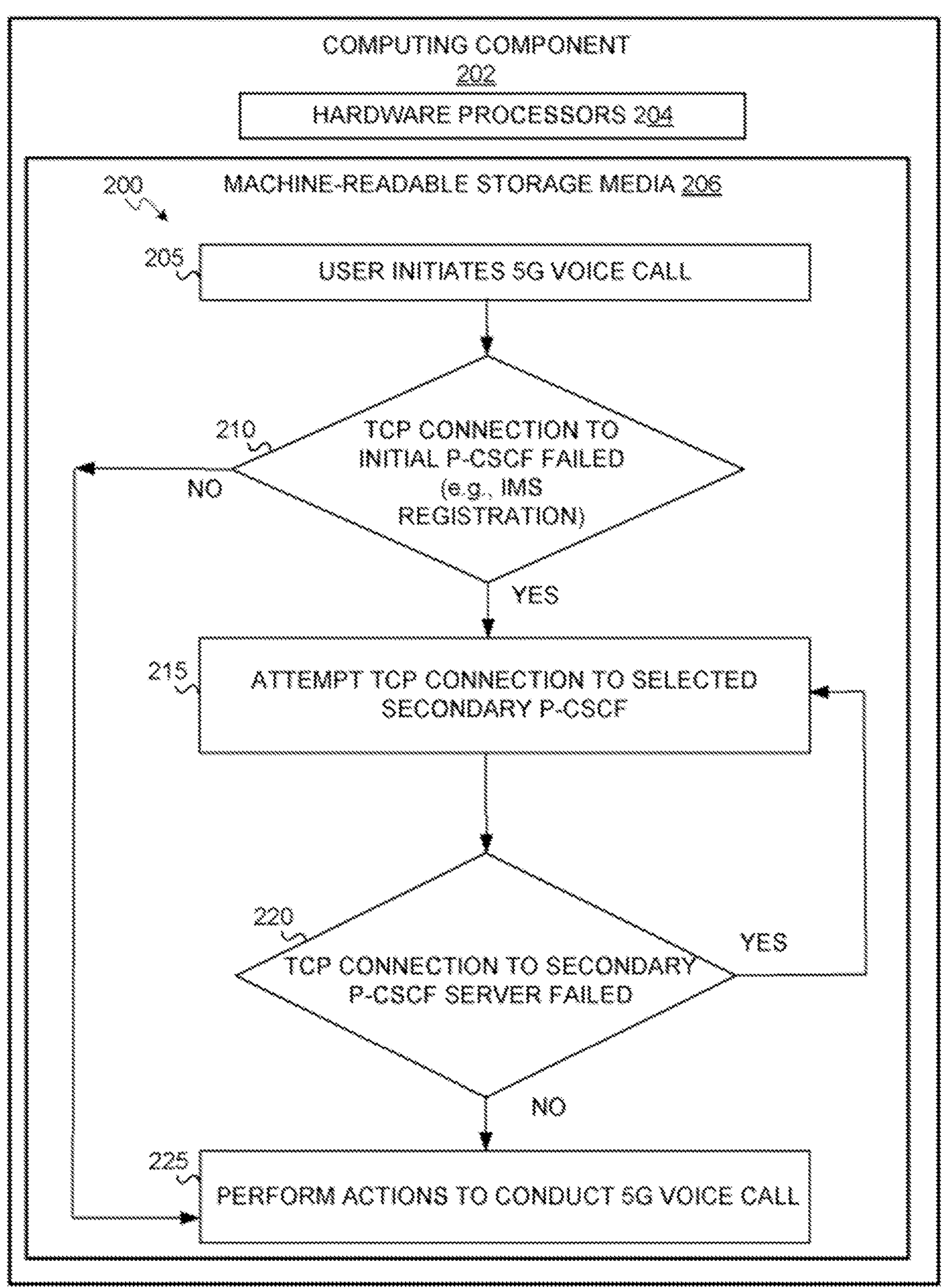
FIG. 2 is an operational flow diagram illustrating an example of a voice call over 5G flow handing procedure that attempts connections to a plurality of available P-CSCF servers, in accordance with some embodiments.

Further details of dynamically modifying the flow for a voice call over 5G NR in order to address P-CSCF server connection failures, according to the disclosed embodiments, are now described with reference to FIG. 2. A flowchart is shown in FIG. 2, illustrating an example of a process 200 that is performed according to one embodiment of the systems and methods described herein. As seen in FIG. 2, process 200 is illustrated as a series of executable operations in a machine-readable storage media 206 performed by a hardware processor 204. The computing component 202 can be a computer device used for telecommunication functions, such as voice, video, and text, that are supported over a 5G network. For example, the computing component 202 may be the 5G-enabled mobile computing device (e.g., smartphone) described above in reference to FIG. 1. Generally, process 200 implements a voice call flow handling procedure that can detect and handle a failure to connect to a P-CSCF server by attempting one or more subsequent connections to other available P-CSCF servers, thus mitigating related IMS registration failures, according to some embodiments.

The process 200 can begin at operation 205, where the user initiates a 5G voice call. For example, the user can dial a 5G-enabled mobile computing device (i.e., UE) for an outgoing voice call, which initiates a call flow for establishing a UE originated voice session over 5G NR. As previously described, a UE is required to first register in IMS in order to utilize the IMS supported voice services over IP needed to conduct the voice call. Further, the UE can register to the IMS over the 5G network via SIP. Thus, the IMG registration flow can involve initiating a TCP connection between the UE and an initial P-CSCF server on the IMS to support the use of SIP in IMS signaling during the registration process. Although the process 200 is described to involve TCP connections to the P-CSCFs, this is not intended to be limiting and the process 200 can be applied to other types of protocols that are suitable to be the underlying transport layer protocol for SIP sessions, such as UDP, SCTP, and the like. Additionally, although process 200 is described with respect to an IMS registration associated with initiating a 5G voice call, the process 200 can also be performed in response to a keep alive IMS registration that may be performed during an on-going 5G voice call.

Next, the process 200 continues by performing a conditional check at operation 210 to determine whether a TCP connection to an initial P-CSCF server has failed. Detecting a TCP connection failure in operation 210 can include identifying a TCP timeout, or employing other mechanisms supported by the protocol that can indicate a TCP connection to a host failed to be established. For instance, a TCP timeout may occur if no traffic flow is detected (e.g., no ACK in reply) for a specified amount of time, indicating a problem with the TCP connection and causing a timeout signal to be communicated. Generally, any initial attempt to establish a TCP connection to a P-CSCF of an IMS at the start of an IMS registration flow (that is associated with the initiated 5G voice call) is routed to an initial P-CSCF server. As previously described, there may be a P-CSCF server in the IMS infrastructure that is defined as the default P-CSCF. Therefore, any initial attempt to create a TCP connection to the IMS for the UE's IMS registration is routed to the default P-CSCF server. Thus, in this scenario, the default P-CSCF acts as the initial P-CSCF. However, other schemes can be used to determine which P-CSCF server, from a plurality of available P-CSCF servers, can server as the initial P-CSCF server in the IMS. In response to determining that the TCP connection to the initial P-CSCF server failed (shown as "Yes" in FIG. 2), then the process continues to operation 215 in order to perform the flow handling procedure that addresses this TCP connection failure in a manner that prevents the full IMS registration failure that would likely occur if this failure was allowed to persist.

As a general description, this branch of the process 200, which includes operations 215-220, can be considered as a sub-routine that is iteratively performed. The sub-routine iteratively selects one or more other available secondary P-CSCF servers to switch to, and correspondingly performs a successive TCP connection attempt to the selected P-CSCF server. According to an embodiment, the sub-routine of process 200, which includes operations 215-220, is iteratively performed until a TCP connection to a selected secondary P-CSCF server is successfully established, an unsuccessful TCP connection attempt has been made with all of the known available secondary P-CSCF servers, or a defined time period (allowing time to re-try TCP connections to other P-CSCF servers in the IMS registration process) expires.

A secondary P-CSCF server may be any of a plurality of additional P-CSCF severs that are also be available for establishing and maintaining a TCP connection in order to supports the UE's registration to an IMS. These secondary P-CSCF servers, as referred to herein, can be other P-CSCF servers that are also available to provide access to IMS services in addition to the initial P-CSCF server. For example, the plurality of secondary P-CSCF servers may be available P-CSCF servers that are deployed on the same IMS architecture as the initial P-CSCF server, or P-CSCFs servers that are on another IMS infrastructure that is available to the UE, for example IMS of a visited server provider network (e.g., roaming).

At operation 215, an attempt to establish another TCP connection to a selected secondary P-CSCF server (from the plurality of available secondary P-CSCF servers) is performed. Operation 215 can involve executing a scheme or algorithm that is defined to determine which secondary P-CSCF server is particularly selected at each iteration. In an embodiment, an available secondary P-CSCF server is selected in accordance with a round-robin scheme, as described in detail above in reference to FIG. 1. In an embodiment, operation 215 involves maintaining a count of a number of failed TCP connections with a particular P-CSCF server such that a P-CSCF server (identified by the P-CSCF address) can be placed on a blacklist if the count (current number of tracked failures) reaches and/or exceeds a defined failure threshold. The failure threshold can be a set number of failures that are deemed allowable before the P-CSCF server is considered to be experiencing persistent issues and placed on a blacklist. Once a P-CSCF server is blacklisted, or otherwise identified as a "failed" or "unavailable" P-CSCF server, connections to support any subsequent IMS registration for the UE will not be routed to that particular P-CSCF server (as an initial P-CSCF server at the start of the IMS registration flow, or as a secondary P-CSCF server in the flow handling procedure).

After a particular secondary P-CSCF server is selected from among the plurality of available P-CSCF servers, then a new attempt to establish a TCP connection with the newly selected secondary P-CSCF server is executed. For example, the routing of a signal from the UE in a handshake to establish this next TCP connection is switched from the initial P-CSCF server to the selected secondary P-CSCF server. Therefore, in response to the failure of the initial TCP connection with the initial P-CSCF, a re-try to establish a TCP connection for the UE's IMS registration is routed to the secondary server. The process 200 then proceeds to operation 220.

At operation 220, a conditional check is performed to determine whether the re-try TCP connection to the selected secondary P-CSCF server (for the current iteration) has failed. In response to determining that the TCP connection to the secondary P-CSCF server failed (shown as "Yes" in FIG. 2), then the process 200 returns to operation 215 and performs another iteration of the sub-routine, selecting a different secondary P-CSCF server from the plurality of available P-CSCF servers and repeating another attempt to establish a TCP connection.

Alternatively, if the check at operation 220 determines that the TCP connection is successfully established with the secondary P-CSCF server (e.g., no failure of the TCP connection) (shown as "No" in FIG. 2), the process 200 can continue to operation 225. Thus, the flow handling procedure of process 200 has successfully established a TCP connection from the UE to a selected secondary P-CSCF server. Due to the TCP connection being created, a SIP session can be enabled to continue to set-up the UE's IMS registration, and the process 200 can proceed.

Next, at operation 225, as a result of properly addressing the TCP connection failure to the P-CSCF server(s), the remaining actions in the flow to register the UE to the IMS, and subsequently conduct the initiated 5G voice call, can be performed. For example, the UE that initiated the voice call can become registered to IMS using SIP (over the TCP connection), and the UE originated voice session is established and conducted over 5G NR (or 4G LTE), based on the 5G deployment.

Referring back to operation 210, if it is determined that the TCP connection to the initial P-CSCF server did not fail (shown as "No" in FIG. 2), that can serve as an indication that the TCP connection was successfully established with P-CSCF and there are no TCP connection failure issues to address. In this case, the nominal call flow can execute, and the IMS registration procedure can complete as expected. That is, the process 200 can move to operation 225 and the actions to conduct the initiated 5G voice call executed. The disclosed techniques can realize an improved user experience for voice calls over the 5G network, by successfully and efficiently completing a voice call in a scenario where a TCP connection with the P-CSCF failed in a manner that would have otherwise resulted in a dropped call over 5G NR in many conventional voice services.

Figure 3:
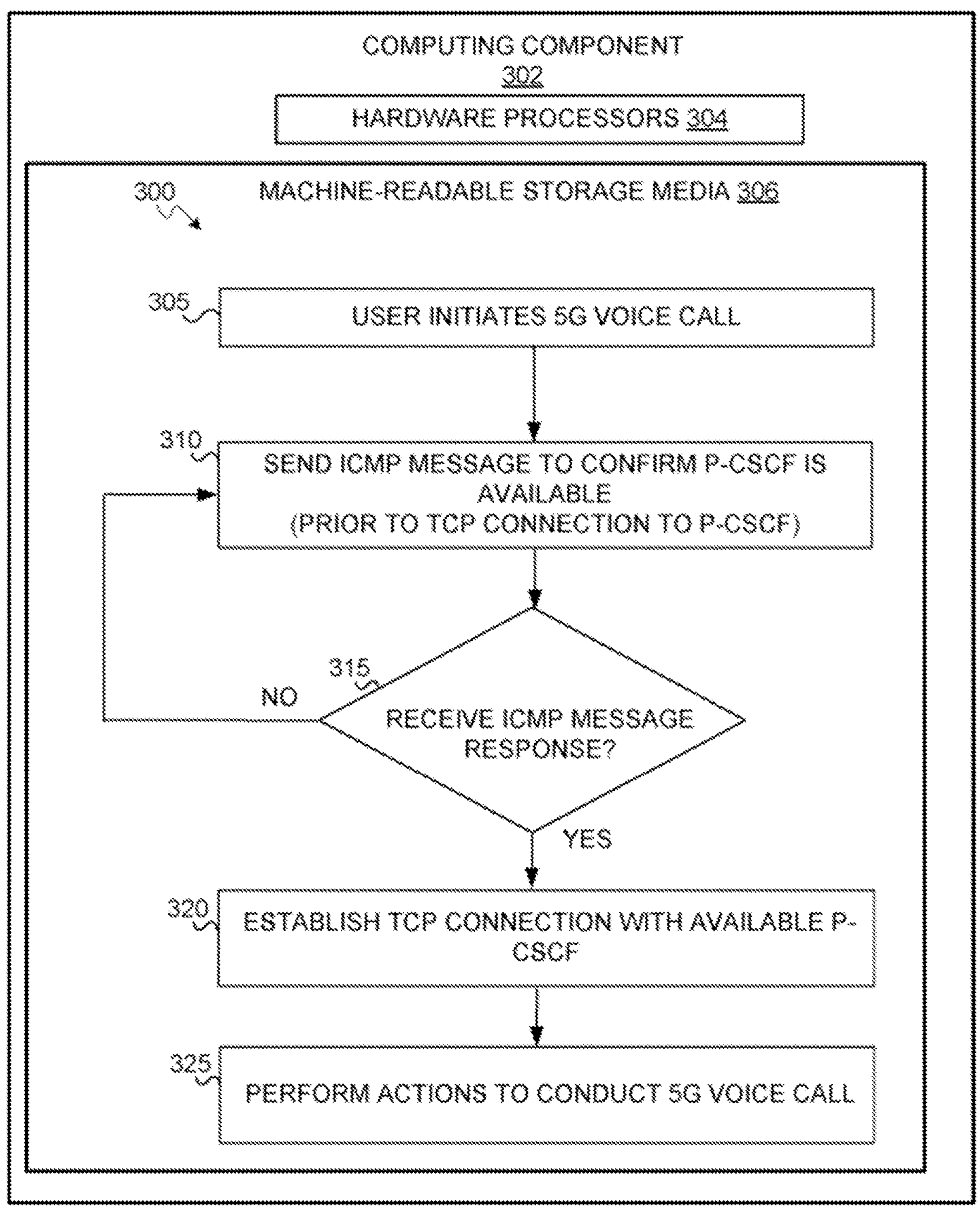
FIG. 3 is an operational flow diagram illustrating an example of another voice call over 5G flow handing procedure that utilizes Internet Protocol Message Protocol (ICMP) messages to confirm availability of a P-CSCF server, in accordance with some embodiments.

FIG. 3 is a flowchart illustrating an example of another process 300 that can be performed as a different handling procedure for voice calls over 5G to address TCP connection failures to P-CSCFs, according to one embodiment described herein. The process 300 can be generally described as detecting whether a P-CSCF server may be experiencing a failure, prior to even attempting to establish the respective TCP connection. Thus, in comparison to the handling procedure described in reference to FIG. 2 which may be more suitable in scenarios where failures are related to disruptions to the TCP connection. The handling procedure of FIG. 3 may be more applicable to failures at the actual P-CSCF server, which can cause the server itself to become unavailable, down, or un-responsive, as opposed to a failure in the connection to the P-CSCF server (which is otherwise operating nominally). FIG. 3 illustrates this process 300 stored as executable operations in a machine-readable storage media 306 performed by a hardware processor 304. The computing component 302 may be the 5G-enabled mobile computer device (e.g., smartphone) described above in reference to FIG. 1, which is configured to perform the disclosed techniques.

At operation 305, the process 300 begins. At operation 305, the user initiates a voice call. For example, the user can employ a 5G-enabled mobile computing device (i.e., UE) for an outgoing voice call, which initiates a call flow for establishing a UE originated voice session over 5G NR. As previously described, a UE is required to first register in IMS in order to utilize the IMS supported voice services over IP needed to conduct the voice call. Further, the UE can register to the IMS over the 5G network via SIP. Thus, the IMS registration flow can involve initiating a TCP connection between the UE and a P-CSCF server on the IMS to support the use of SIP in IMS signaling during the registration process.

Prior to attempting to establish the TCP connection with a P-CSCF server for IMS registration, the process 300 continues to operation 310 to start a handling procedure. As a general description, the call handling procedure of process 300 is adjusted to first confirm whether the P-CSCF server is operational (or responsive). In other words, by determining whether a P-CSCF server is even functioning, it can be determined, in turn, whether it is even possible to make a TCP connection with this particular server host. That is, it would be practically impossible to establish a TCP connection with a P-CSCF server that is down, or inoperational, and thus attempting and re-retying create a TCP connection to a P-CSCF server that is not functioning would be futile. Accordingly, the handling procedure implemented by process 300 can achieve lower latency as compared to the other disclosed schemes, by avoiding some TCP connection that have a high likelihood of failure (e.g., attempting a TCP connection to a down P-CSCF server), and thereby eliminating the time delays associated with timeouts and retransmissions that accompany such failed TCP connections.

At operation 310, an Internet Control Message Protocol (ICMP) message, such as a ping packet, is sent to the P-CSCF server which is the intended host for the upcoming TCP connection. As background, ICMP is a supporting protocol in the Internet protocol suite. ICMP is used by network devices, such as routers, in order to send error messages and operational information indicating success or failure when communicating with another IP address, for example, when an error is indicated when a requested service is not available or when a host (or router) could not be reached. Accordingly, in this scenario, ICMP capabilities can be leveraged for indicating that a P-CSCF server could not be reached, which may be indicative that the server is unresponsive or otherwise not functioning.

In particular, operation 310 can utilize ICMP Ping. Ping is a computer network administration software utility that is used to test the reachability of a host on an IP network. For example, the process 300 can ping a P-CSCF server by sending an ICMP ping packet (also referred to as an echo request packet) to the target host, namely the aforementioned P-CSCF server, and waiting for the corresponding ICMP ping packet response (also referred to as the echo reply). Although the process 300 is described with respect to ping, the implementation is not intended to be limiting and other ICMP messages or TCP/IP application can be used to confirm whether a P-CSCF server is available, such as telnet, ftp, traceroute, and the like.

Accordingly, at operation 315, a conditional check is performed to determine whether a response to the ICMP message, namely the ICMP ping packet is received. If an ICMP ping packet response is received from the P-CSCF server in response to sending the ping (shown as "Yes" in FIG. 3), it confirms that the P-CSCF is operating and is responsive. It can be assumed that a responsive P-CSCF server can communicate in a manner that allows establishing a TCP connection to be possible. Consequently, after it is confirmed that the P-CSCF is responsive, the process can continue to operation 320.

Thereafter, at operation 320, since the P-CSCF server is responding, it is deemed appropriate for the call handling procedure to proceed with establishing a TCP connection with the P-CSCF server. Once the TCP connection to the P-CSCF server is successfully established, a SIP session can be supported in order to perform the UE's IMS registration. The nominal call flow can execute, and the IMS registration procedure can complete as expected. That is, the process 300 can move to operation 325 and the actions to conduct the initiated 5G voice call are executed.

The disclosed techniques can realize an improved user experience for voice calls over the 5G network, by successfully and efficiently completing a voice call in a scenario where a TCP connection with the P-CSCF failed in a manner that would have otherwise resulted in a dropped call over 5G NR in many conventional voice services.

Referring back to operation 315, in the case where an ICMP ping packet response is not received (shown as "No" in FIG. 3), this confirms that the P-CSCF server is not responding, which may be indicative that the P-CSCF is not functioning or "unavailable". As a result, the process 300 can return to operation 310, and iteratively send ICMP ping packets to the P-CSCF server. In an embodiment, a subroutine of process 300, which includes operation 310 and 315, can be performed iteratively. For example, process 300 can continue to ping the P-CSCF server and wait for a response, until a ping packet response is successfully received or until a defined time period expires. This process may be particularly advantageous in scenarios where a P-CSCF server may be experiencing issues that cause it to be temporarily unresponsive, as opposed to completely non-operational.

Alternatively, if issues at the P-CSCF server persist, this could indicate that the P-CSCF server may be experiencing a more substantive or catastrophic failure. In such an event, where a P-CSCF server is unavailable for a prolonged period (or permanently), the process 300 can perform one or more of the other handling procedures disclosed herein. By continuing with an additional handling procedure, the process can further address the TCP connection failure with the P-CSCF server (e.g., if the issue cannot be resolved by process 300 prior to attempting the TCP connection) in a manner that prevents the UE from completely failing to register to IMS, which can impact the user's overall experience. The disclosed techniques can realize an improved user experience for voice calls over the 5G network, by leveraging ICMP to check the P-CSCF sever availability before attempting to establish a TCP connection. Accordingly, the procedure reduces the likelihood that the UE will make multiple unnecessary TCP connection attempts to P-CSCF servers that are not functioning, which may further lead to delays and failures that impact the user's experience.

Additionally, there may be an operational scenario where the UE is not able to establish a TCP connection to any of the available P-CSCF servers in order to support its IMS registration. Such a widespread failure, which affects all of the available P-CSCF servers, can be an indication that the root cause may not be the actual TCP connection, or operation of the P-CSCF servers. Rather, there may be a more preliminary issue. For example, errors could be occurring while setting-up the UE's configuration to initiate connecting to the P-CSCF. Type of errors that may be related to setting-up the UE's configuration can include, but are not limited to, having invalid IP addresses for P-CSCF server(s), or having invalid host name(s) for the P-CSCF server(s), which could cause problems that become evident later in the TCP connection establishment and/or IMS registration procedures.

Figure 4:
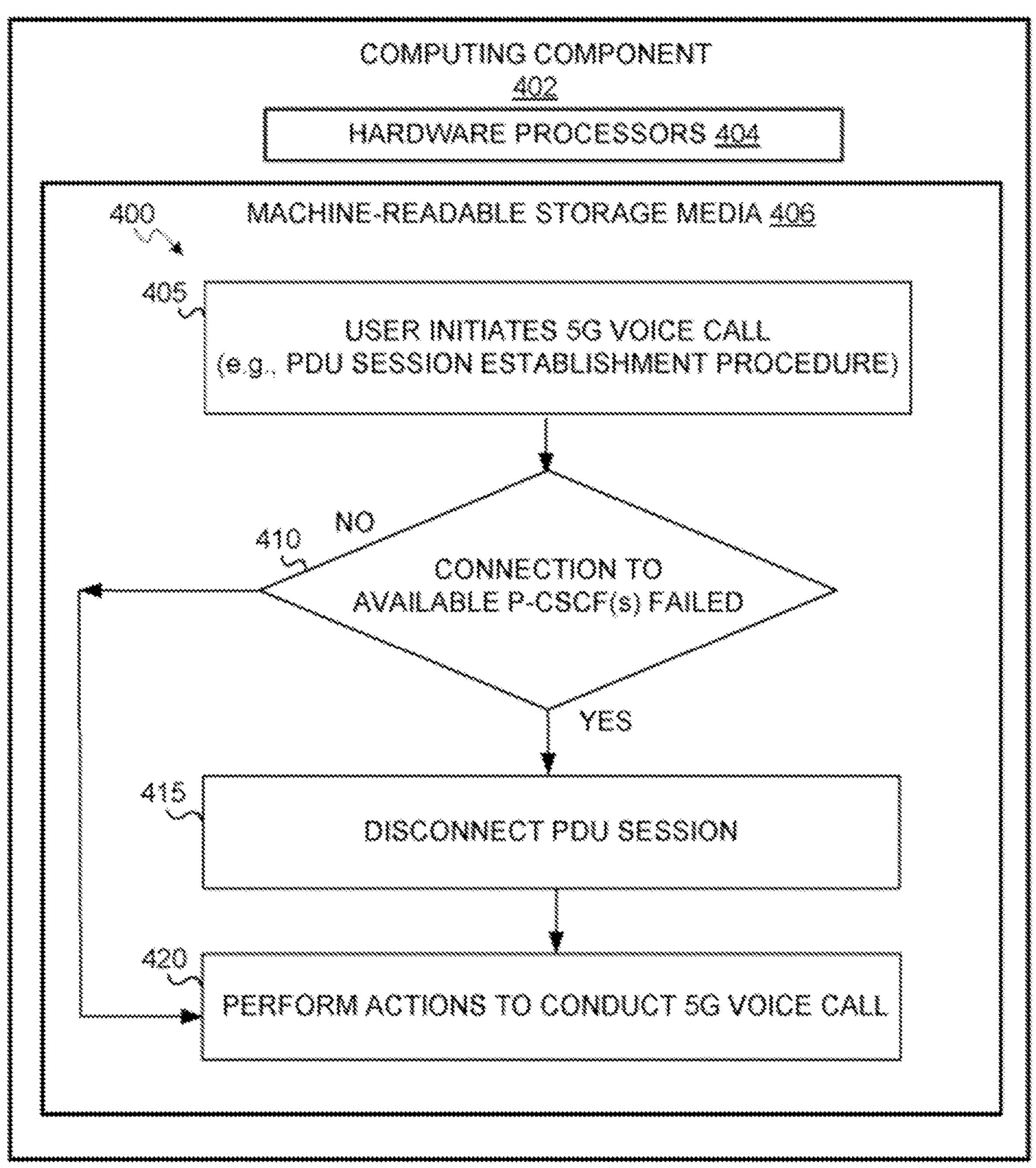
FIG. 4 is an operational flow diagram illustrating an example of another voice call over 5G flow handing procedure that perform disconnection to a Protocol Data Unit (PDU) session, in accordance with some embodiments.

The disclosed embodiments address these concerns, by employing a handling procedure (implemented by process 400 of FIG. 4) that can retry establishing a UE's PDU session with the network. Establishing the PDU session, which is described in further detail below, is executed early in the call flow for conducting a voice call over 5G and is used to perform the aforementioned set-up to configure the UE to be able to connect to the P-CSCFs. As alluded to above, the flow for establishing a VoNR call, for example, can start with the UE establishing an IMS data network name (DNN) packet data unit (PDU) session in 5GC as a prerequisite for voice session setup. Particularly for VoNR, this portion of the flow can be referred to as a PDU session establishment procedure. Regarding VoLTE, a similar procedure is employed to establish an IMS PDN connection (as opposed to the PDU session in VoNR) for the UE. The handling procedure implemented by process 400 in FIG. 4, is applicable to both PDU sessions (in the case of VoNR) and IMS PDN connections (in the case of VoLTE). FIG. 4 is a flowchart illustrating an example of this process 400, which implements the aforementioned handling procedure for voice calls over 5G, according to one embodiment described herein.

FIG. 4 depicts a flowchart illustrating the process 400 stored as executable operations in a machine-readable storage media 406 performed by a hardware processor 404. The computing component 402 may be the 5G-enabled mobile computer device (e.g., smartphone) described above in reference to FIG. 1, which is configured to perform the disclosed techniques.

The process 400 begins at operation 405, where the user initiates a voice call. For example, the user can employ a 5G-enabled mobile computing device (i.e., UE) for an outgoing voice call, which initiates a call flow for establishing a UE originated voice session over 5G NR. As a part of the call flow for VoNR, operation 405 can also include executing the PDU session establishment procedure. In order for the UE to begin its registration to the IMS, a PDU session, which is used to set-up the configuration which is required to do IMS registration) must be established, as a prerequisite for voice session setup.

Accordingly, as an example, operation 405 can involve the UE transmitting a PDU session establishment request, which initiates setting-up the configurations that are required to perform the UE's IMS registration. For instance, the PDU session establishment request message is requesting a PDU setup with DNN="ims" and is also requesting the IP address for the P-CSCF to be used for connecting to the IMS. Once the network receives the PDU session establishment request message from the UE, the network informs the UE of the requested information, namely information pertaining to the P-CSCFs, and creates a QoS pipe that is necessary for the traffic. The handling procedure implemented by process 400 can leverage this function of the PDU session establishment procedure and can restore and/or re-retransmit the P-CSCF information to the UE which could potentially correct errors related to setting-up the configuration for UE the connect to P-CSCF, such as the UE receiving an invalid IP address for one or more of the P-CSCF servers.

After the PDU session establishment procedure is completed, the flow for IMS registration can begin, which involves setting up a TCP connection between the UE and a P-CSCF. Therefore, after operation 405, which performs the PDU session establishment, the process can proceed to operation 410, which determines whether establishing the TCP connections with the available P-CSCFs have failed.

Next, at operation 410, a conditional check is performed to determine whether establishing TCP connections to all of the available P-CSCF servers have failed. In an embodiment, process 400 can include performing the previously described handling procure that attempts to establish TCP connections to a plurality of available P-CSCF server in a round-robin scheme. Continuing with this example, operation 410 can determine that the UE has failed to connect to all the available P-CSCF servers (shown as "Yes" in FIG. 4) after a full cyclic round of the scheme has completed, and each attempt to establish a TCP with each of the available servers has failed, respectively. Accordingly, the process 400 continue to operation to execute the handling procedure to address this type of failure.

The failure detected in previous operation 410 may suggest that some error or issue has occurred in setting-up the configuration for the UE to connect to the P-CSCFs, since the UE is not able to successfully connect to any of the P-CSCF servers provided by the network during the PDU session establishment procedure. Consequently, it may be possible for this type of issue to be resolved by re-trying the PDU session establishment procedure. In particular, at operation 415, the current PDU session associated with the initial PDU session establishment procedure (of operation 405) is disconnected, and a PDU session reconnect is then performed as a mechanism to restore the P-CSCF addresses from the network. In an embodiment, a PDU session is reconnected by the UE transmitting another PDU session establishment request and thereby performing a subsequent PDU session establishment procedure. Moreover, as alluded to above, when the handling procedure of process 400 is implemented for VoLTE, operation 415 involves disconnecting, and then reconnecting, an IMS PDN connection.

In the event that reconnecting the PDU session in operation 415 communicates P-CFCS information to the UE in a manner that successfully resolves the TCP connection issues, the process 400 can continue. That is, in response to the UE successfully establishing a TCP connection with one of the available P-CSCF servers provided by the network in the re-try PDU session establishment procedure, the process 400 moves to operation 420. At operation 420, after the TCP connection is successfully established to a P-CSCF server, a SIP session can be supported in order perform the UE's IMS registration. The nominal call flow can execute, and the IMS registration procedure can complete as expected. Thus, operation 325 can include executing further actions to conduct the initiated 5G voice call, as the handling procedure has addressed TCP connection failures that would have otherwise caused the 5G voice to call drop.

Referring back to operation 410, in the case where the check determines that TCP connections to all of the available P-CSCF server did not fail (e.g., the UE successfully established a TCP connection to at least one available P-CSCF) the process 400 can go directly to operation 425. At operation 425, call handling actions are performed that will ultimately conduct the voice call over 5G NR (or 4G LTE).

Figure 5:
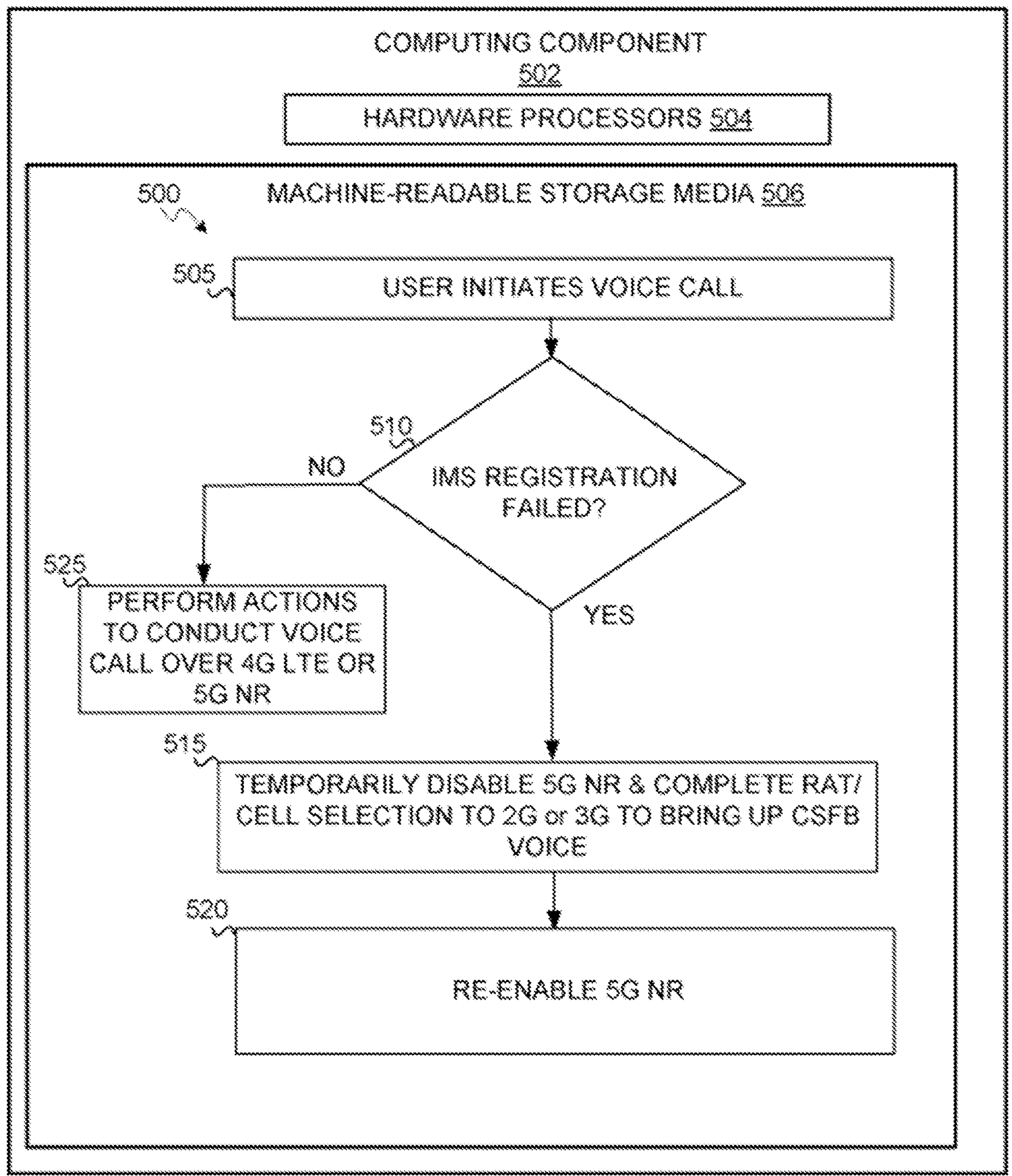
FIG. 5 is an operational flow diagram illustrating an example of another voice call over 5G flow handing procedure that temporarily disables New Radio (NR) or Long Term Evolution (LTE) based on an IMS registration failure, in accordance with some embodiments.

Referring now to FIG. 5, a flowchart illustrating an example of another process 500 is depicted, which implements yet another handling procedure for voice calls over 5G, according to one embodiment described herein. Generally, process 500 implements a procedure that handles a voice call when an IMS registration failure does occur over 5G, as a result of failed TCP connections to the P-CSCFs. For example, in any of the problematic operational scenarios previously described, a TCP connection failure may not be resolved in a manner that completely avoids the UE's IMS registration procedure from failing, which leaves the UE unregistered and thus unable to utilize the IMS voice services.

The process 500 can be generally described as temporarily disabling LTE or NR, in order to fall back to a legacy system, namely a CS RAT, if the UE's IMS registration has failed with all the available P-CSCF servers. FIG. 5 illustrates this process 500 stored as executable operations in a machine-readable storage media 306 performed by a hardware processor 504. The computing component 502 may be the 5G-enabled mobile computer device (e.g., smartphone) described above in reference to FIG. 1, which is configured to perform the disclosed techniques.

At operation 505, the process 500 begins. At operation 505, the user initiates a voice call. For example, the user can employ a 5G-enabled mobile computing device (i.e., UE) for an outgoing voice call, which initiates a call flow for establishing a UE originated voice session over 5G NR. Then, the process 500 continues by performing a conditional check at operation 510 to determine whether the IMS registration of the UE has failed. For example, a UE may not be able to establish a TCP connect to any of a plurality of available P-CSCF servers. As a result, the UE cannot set-up the required SIP session (over TCP) in order to complete its IMS registration procedure. In other words, if a TCP connection to each of the available P-CSCF servers fails, it may ultimately lead to an overall failure of the UE's IMS registration procedure and the UE's capability to conduct a call over 5G.

According to an embodiment, process 500 can include performing one or more of the previously described handling procures for addressing TCP connection failures prior to performing the check at operation 510. As an example, that UE may attempt to establish TCP connections to a plurality of available P-CSCF servers in a round-robin scheme. However, as alluded to above, if the UE fails to properly connect, via TCP, to any of the available P-CSCF servers, the UE will further experience a failure in registering with the IMS, which impacts the UE's ability to conduct a 5G voice call, either over VoLTE or VoNR.

Then, the process 500 continues by performing a conditional check at operation 510 to determine the status of the IMG registration that is associated with the initiated voice call. Particularly, operation 510 checks to determine whether the UE's IMS registration has failed over 5G. If it is determined that an IMS registration status (associated with the UE's initial IMS registration request) is "failed" (shown as "Yes" in FIG. 5), this indicates that there is an IMS registration failure over 5G that potentially resulted from the aforementioned TCP connection failures. The process 500 can execute a handling procedure that, in response to detecting the IMS registration failure, attempts to conduct a call in a manner that does not require IMS registration, as opposed to waiting until there is a full voice call failure due to the UE not being registered. Consequently, the process 500 may realize a reduced number of voice calls that are dropped over 5G (e.g., improving the voice call success rate over 5G). In some cases, operation 510 involves identify an IMS registration status that is transmitted in response to an IMS registration request from the UE. For example, if an IMS registration status includes a "not registered" or "not complete" status indication, operation 510 can ascertain that the UE's IMS registration procedure failed. In an embodiment, operation 510 can employ TCP connection detection capabilities, as previously described, in order to determine an IMS registration failure. For instance, after a full cyclic round of a round-robin scheme has completed, and it is detected that each attempt to establish a TCP with each of the available servers has failed, then operation 510 can consider this as an indication that the IMS registration will also failed. Process 500 will continue to operation 515 in response to a detected IMS registration failure, where detecting the failure is based on identifying IMS registration statuses or based on detecting that the UE has failed to connect to all the available P-CSCF servers. In this case where the UE has an IMS registration failure, then the process 500 proceeds to operation 515 to immediately fall back to a legacy system.

Thereafter, at operation 515, the UE's 5G NR (or LTE) can be temporarily disabled, and a RAT/cell selection of 2G or 3G performed. Thus, by falling back to RAT, CSFB voice service can be brought up. As previously described, the type of voice support in 5G depends on the available radio access technology (RAT). Some deployments may use a PS domain and a circuit switch domain, which allows the CS RAT to still be available. Accordingly, 2G and 3G CS voice service can still be used in this type of deployment.

This particular flow for handling the voice call can leverage this deployment in order to avoid dropped calls that may otherwise occur in 5G NR if the IMS registration cannot be completed, by directing the UE to fall back to the CSFB as soon as an indication of a IMS registration failure is detected. The CSFB provides a fallback scheme that enables a handover during voice connection setup from NR (or LTE) to 2G or 3G circuit switched voice. CSFB does not require the IMS-based voice support, and thus eliminates the requirement to register to IMS (as required by voice over 5G NR) to conduct the voice call. Furthermore, there may be a defined time period that is applied for temporarily disabling the UE's NR or LTE. For instance, the time period may allow enough time for the voice call to be completed using CSFB, before re-enabling the NR and LTE. Alternatively, NR or LTE remains disabled based on other variables other than time, such as user mobility.

Referring back to operation 510, in the case where the check determines that the IMS registration status is "complete", the process 500 can go to operation 525. At operation 525, call handling actions are performed that will ultimately conduct the voice call over 5G NR or 4G LTE, because the UE's IMS registration procedure successfully completed (e.g., UE registered to IMS), which enables its voice over 5G capabilities.

After the UE initiated voice call is complete, the process 500 can continue to operation 520. Operation 520 involves disconnecting the call over CSFB, and re-enabling NR on the UE. After the NR is re-enabled, handover from the CS RAT can be returned back to 5G NR. Because the NR (or LTE) is only temporarily disabled, the UE can return back to 5G NR (or 4G LTE) and can subsequently re-attempt to register to IMS. Thus, even if CSFB is needed to establish a single voice call, the UE does not have to continue to operate using CS RAT. Once the UE is able to successfully register to IMS, this flow allows the UE to retry its IMS registration procedure over 5G and to then conduct any subsequent voice calls over 5G NR which provides enhanced voice services, such as HD voice, for the user.

Figure 6:
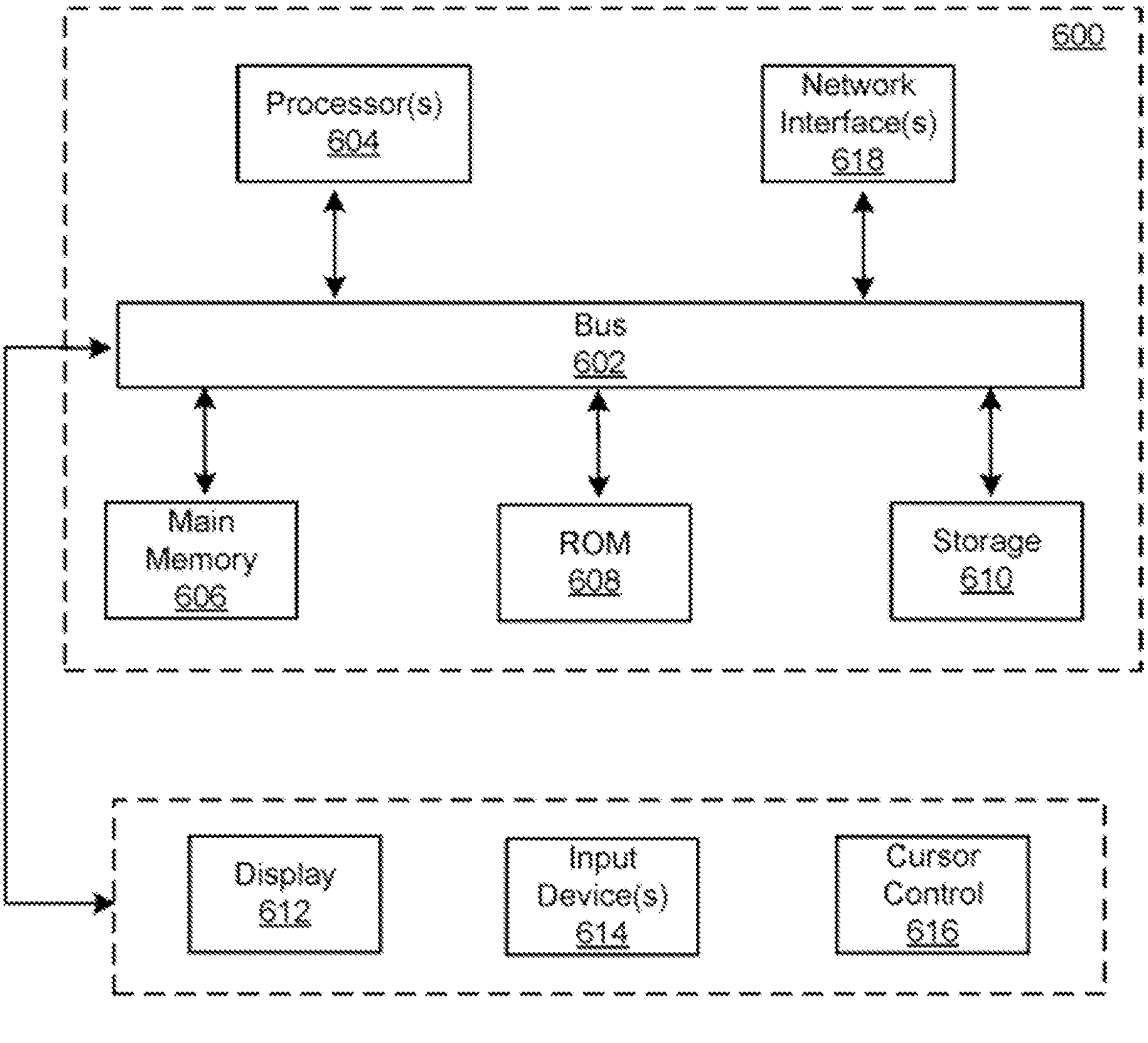
FIG. 6 is a block diagram of an example computing component or device for implementing the disclosed techniques, in accordance with the disclosure.

FIG. 6 depicts a block diagram of an example computer system 600 in which various features described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random-access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may include non-volatile media and/or volatile media. Non-volatile media includes, for example, optical or magnetic disks, such as storage device 910. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that include bus 902. Transmission media can also take the form of acoustic or light waves, such as those generated during radio-wave and infra-red data communications.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the worldwide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors including computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method comprising:

initiating a voice call, wherein the voice call comprises a voice session over 5G new radio (NR) initiated via a user equipment (UE);

in response to a failure of a first connection to an initial Proxy-Call Session Control Function (P-CSCF) server, selecting a secondary P-CSCF server from a plurality of P-CSCF servers based on a round-robin scheme, wherein each of the plurality of P-CSCF servers are available to connect to the UE; and attempting to establish a second connection to the selected secondary P-CSCF server, wherein the secondary connection supports a registration to an IP Multimedia Subsystem (IMS) for the UE to conduct the voice call as the voice session over 5G NR;

wherein the method further comprises:

in response to a failure of the UE to connect to all of the plurality of P-CSCF servers, disconnecting a Protocol Data Unit (PDU) session associated with the registration to the IMS for the UE; and performing a subsequent PDU session establish procedure for reconnecting the PDU session to restore P-CSCF addresses corresponding to the initial P-CSCF server and the plurality of P-CSCF servers.

2. The computer-implemented method of claim 1, further comprising:

in response to a success of the second connection to the selected secondary P-CSCF server, performing actions to conduct the voice call as the voice session over 5G NR.

3. The computer-implemented method of claim 2, wherein the second connection to the selected secondary P-CSCF server is a Transmission Control Protocol (TCP) connection.

4. The computer-implemented method of claim 3, wherein performing actions to conduct the voice call as the voice session over 5G NR comprises:

establishing a Session Initiation Protocol (SIP) session over the TCP connection, wherein the SIP session supports the registration to the IMS for the UE.

5. The computer-implemented method of claim 4, wherein the failure of the first connection to the initial P-CSCF server comprises identifying a TCP timeout.

6. The computer-implemented method of claim 1, further comprising:

maintaining a count of the number of failed connections with the initial P-CSCF server; and in response to the count having reached the defined threshold, placing the initial P-CSCF server on a blacklist associated with the registration to the IMS for the UE.

7. The computer-implemented method of claim 1, wherein the initial P-CSCF server and the plurality of P-CSCF servers are deployed on the IMS infrastructure.

8. The computer-implemented method of claim 1, further comprising:

in response to a failure of the registration to the IMS for the UE, temporarily disabling 5G NR on the UE;

completing a radio access technology (RAT) selection of 2G or 3G for the UE;

bringing up circuit switched fallback (CSFB); and conducting the voice call using circuit switch voice services.

9. The computer-implemented method of claim 8, wherein the failure of the registration to the IMS for the UE is based on the UE failing to connect to each of the plurality of P-CSCF servers.

10. The computer-implemented method of claim 8, further comprising re-enabling the 5G NR.

11. The computer-implemented method of claim 1, comprising:

prior to establishing a connection with the initial Proxy-Call Session Control Function (P-CSCF) server for the UE, sending an Internet Control Message Protocol (ICMP) message to the P-CSCF.

12. The computer-implemented method of claim 11, further comprising:

determining if an ICMP response message is received from the initial P-CSCF server in response to the ICMP message, wherein receiving the ICMP response message confirms an availability of the initial P-CSCF server; and in response to determining that the ICMP response message is successfully received to confirm the availability of the initial P-CSCF server, establishing a connection with the initial P-CSCF server.

13. The computer-implemented method of claim 11, wherein the ICMP message is a ping packet and the ICMP response is a ping packet response.

14. The computer-implemented method of claim 12, further comprising: in response to determining that the ICMP response message is not received, continuing to send ping packets to the initial P-CSCF until a ping packet response is successfully received or until a defined time period expires.

15. The computer-implemented method of claim 12, wherein the connection to the initial P-CSCF server is a Transmission Control Protocol (TCP) connection.

16. The computer-implemented method of claim 15, further comprising: establishing a Session Initiation Protocol (SIP) session over the TCP connection, wherein the SIP session supports a registration to an IP Multimedia Subsystem (IMS) for the UE to conduct the voice call as the voice session over 5G NR; and performing actions to conduct the voice call as the voice session over 5G NR.

17. A computer system, comprising:

one or more processors; and a memory having instructions stored thereon, which when executed by the one or more processors cause the processors to perform:

initiating a voice call, wherein the voice call comprises a voice session over 5G new radio (NR) initiated via a user equipment (UE);

in response to a failure of a first connection to an initial Proxy-Call Session Control Function (P-CSCF) server, selecting a secondary P-CSCF server from a plurality of P-CSCF servers based on a round-robin scheme, wherein each of the plurality of P-CSCF servers are available to connect to the UE; and attempting to establish a second connection to the selected secondary P-CSCF server, wherein the secondary connection supports a registration to an IP Multimedia Subsystem (IMS) for the UE to conduct the voice call as the voice session over 5G NR;

wherein the one or more processors are further configured to perform:

in response to a failure of the UE to connect to all of the plurality of P-CSCF servers, disconnecting a Protocol Data Unit (PDU) session associated with the registration to the IMS for the UE; and performing a subsequent PDU session establish procedure for reconnecting the PDU session to restore P-CSCF addresses corresponding to the initial P-CSCF server and the plurality of P-CSCF servers.

18. The computer system of claim 17, wherein the computing system is a 5G-enabled mobile computing device.

* * * * *